Oct. 17, 1961 G. A. KNAPP ET AL 3,005,193
HAZARD WARNING LAMP
Filed Dec. 31, 1959 3 Sheets-Sheet 1
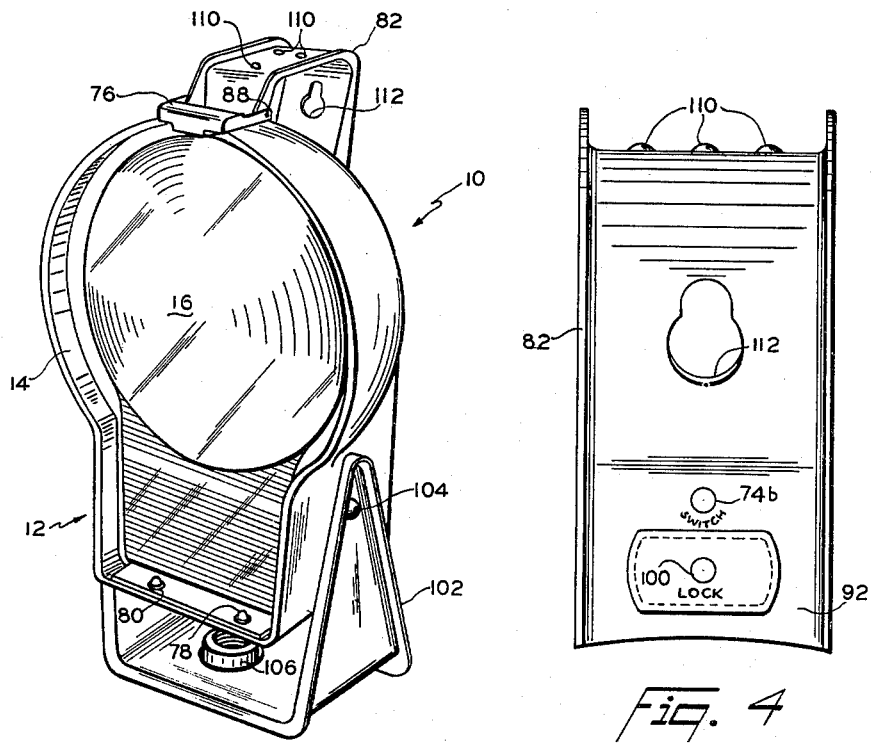
Fig. 1
Fig. 4
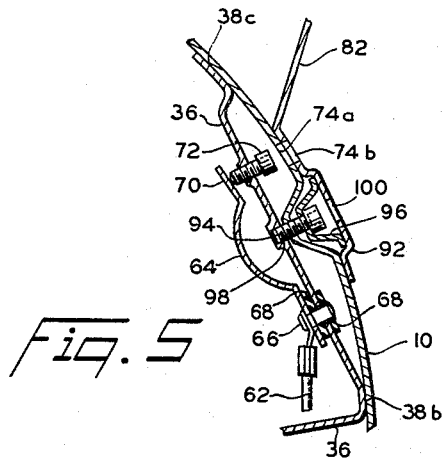
Fig. 5
INVENTORS
GEORGE A. KNAPP
ARTHUR J. PULOS
DOUGLAS R. CLEMINSHAW
BY
Richard von K. Bruns
Atty.

Oct. 17, 1961 G. A. KNAPP ET AL 3,005,193
HAZARD WARNING LAMP
Filed Dec. 31, 1959 3 Sheets-Sheet 2

INVENTORS
GEORGE A. KNAPP
ARTHUR J. PULOS
DOUGLAS R. CLEMINSHAW
BY
Richard von K. Bruns
Atty.

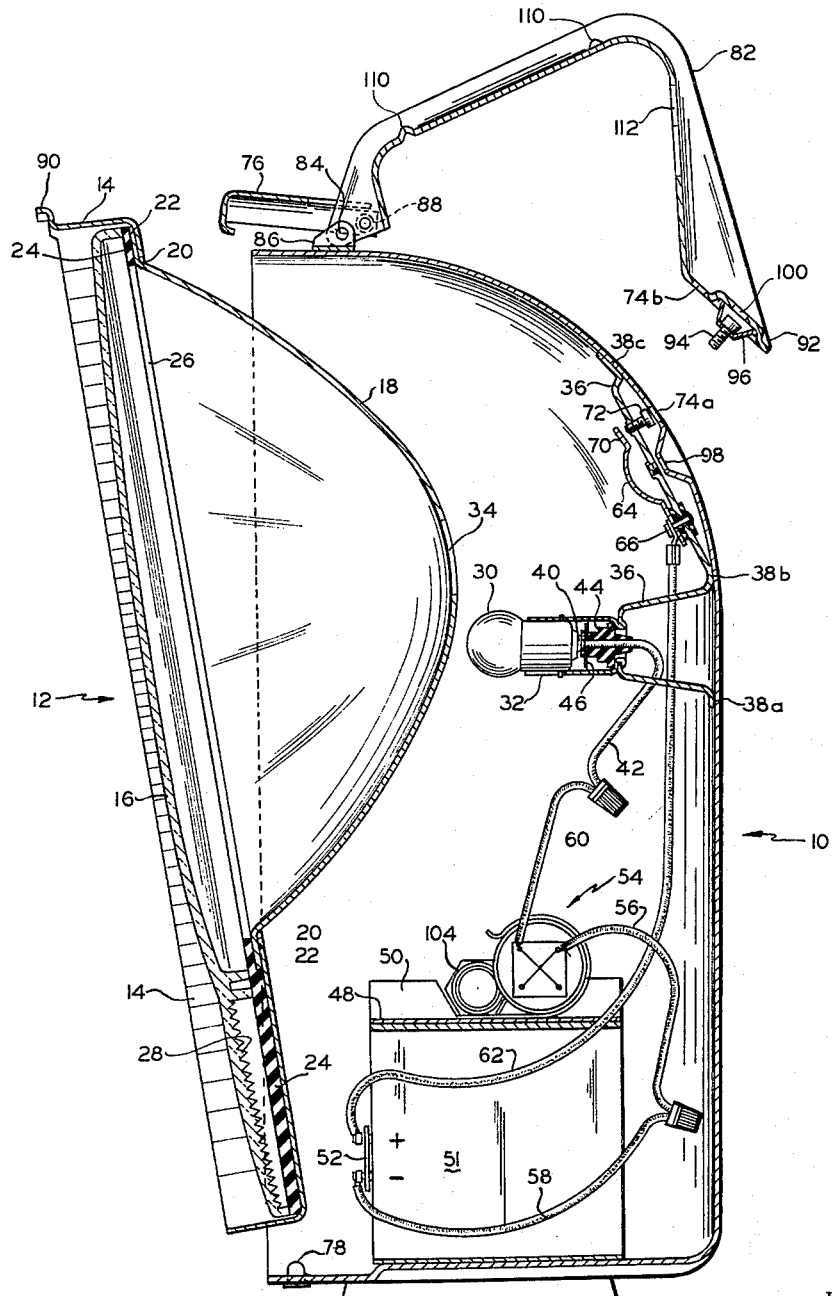

United States Patent Office 3,005,193
Patented Oct. 17, 1961

3,005,193
HAZARD WARNING LAMP
George A. Knapp, Dewitt, Arthur J. Pulos, Fayetteville, and Douglas R. Cleminshaw, Syracuse, N.Y., assignors to R. E. Dietz Company, Syracuse, N.Y., a corporation of New York
Filed Dec. 31, 1959, Ser. No. 863,310
13 Claims. (Cl. 340—366)

This invention relates generally to warning devices for traffic hazards, and has particular reference to portable flasher warning lamps of the barricade type.

A general object of the invention is to provide a novel construction and arrangement for flasher warning lamps of the above type which results in lamps that are exceedingly effective in the performance of the warning function and at the same time are highly dependable in operation.

Another object of the invention is to provide a battery operated flasher warning lamp which operates with superior efficiency and hence is capable of performing longer with conventional batteries and lamp bulbs than has heretofore been generally possible with other lamps of this type.

Another object of the invention is to provide a flasher warning lamp having a large directional light of unusually high intensity.

A further object of the invention is to provide a flasher warning lamp having a substantially tamper-proof construction so that it will be difficult for unauthorized persons to turn the lamp off or otherwise meddle with it when it is left unattended to mark a traffic hazard.

A still further object of the invention is to provide a flasher warning lamp having a weathertight construction so that the operation thereof will normally be unaffected by rain or snow.

Still another object of the invention is to provide a flasher warning lamp construction which is strong and durable and yet can be manufactured and marketed relatively inexpensively. In this connection, it will be seen as the description proceeds that the lamp is constructed and arranged that it can be assembled in an extremely quick and efficient manner.

An additional object of the invention is to provide a flasher warning lamp having a novel interior arrangement for the electrical components of the lamp.

A more specific object of the invention is to provide a flasher warning lamp wherein the entire front wall of the lamp, including the lens and reflector for the lamp bulb, is removable as a unit to enable easy installation and servicing of the electrical system.

Another specific object of the invention is to provide a flasher warning lamp having a novel pivotable handle construction including means on the handle for locking the front wall of the lamp against removal.

A further specific object of the invention is to provide a flasher warning lamp having novel means for mounting the lamp on a barricade, which means enables pivotal adjustment of the lamp in both the horizontal and vertical directions for proper aiming.

Other objects and advantages of the invention will become apparent from the following detailed description thereof read in conjunction with the accompanying drawings which illustrate a representative embodiment of the invention for the purpose of disclosure.

In the drawings:

FIGURE 1 is a front perspective view of a flasher warning lamp embodying the invention;

FIGURE 3 is a vertical sectional view corresponding to FIGURE 2, showing the handle and latching member in position for releasing the front wall of the lamp, and the manner of removing same;

FIGURE 4 is an enlarged rear elevation of the lamp carrying handle; and

FIGURE 5 is an enlarged vertical section showing the details of handle locking means and the on-and-off switch for the lamp.

Figure 2:
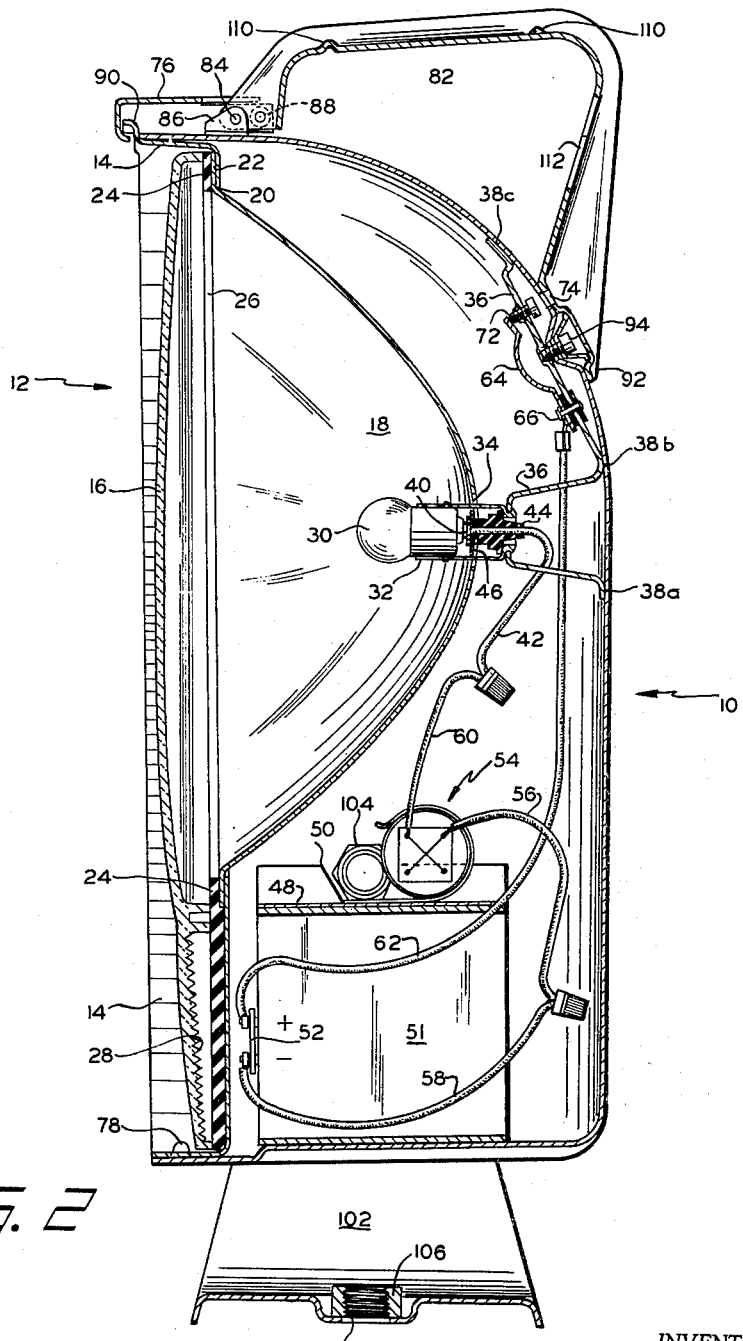
FIGURE 2 is a greatly enlarged vertical section through the approximate center of the lamp, showing the lamp carrying handle and latching member in position for locking the front wall of the lamp against removal.

Referring now to the drawings, wherein like reference numbers designate the same part in each of the views, 10 generally indicates the lamp housing which is an upstanding unitary shell having a generally keyhole shaped front elevation as indicated in FIGURE 1. The housing as formed is open at its front side, and a removable closure 12 is provided therefor. The closure or front wall 12, FIGURES 1–3, comprises a generally keyhole shaped frame 14 conforming to the shape of the front of the housing, a lens 16 having a similar configuration, and a parabolic reflector 18.

The reflector 18 projects rearwardly through a circular opening 20 in the back wall of the frame 14 and is formed with a peripheral flange 22 which abuts against the outside surface of this back wall as shown in FIGURES 2 and 3. A generally keyhole shaped gasket 24, having a circular opening 26, in registry with the outside edge of the reflector, is positioned in front of the frame back wall, and the lens 16 is mounted in front of the gasket with its peripheral edge in engagement therewith. The reflector, gasket and lens are held in assembled relation in the front wall frame 14 by means of screws (not shown) which project through the back wall of the frame and are threaded into bosses (not shown) formed in the lens at spaced intervals around its inside edge.

The lens 16 is preferably injection molded plastic and may be formed with suitable optics on its inner side opposite the reflector 18, the optics being chosen to give the lamp the desired light emitting characteristics. In the area of the lens below the reflector, it may be provided with optics 28 which will cause light directed toward the lamp to be reflected if the lamp is not lighted.

The lamp bulb 30 is mounted in a bayonet type socket 32 which projects through a central opening 34 in the back of the reflector 18, see FIGURES 2 and 3. Socket 32 is supported by a metal strap or bracket 36 that is secured to the rear wall of the housing at points 38a, 38b and 38c as by spot welding. The base terminal of the lamp bulb engages a contact 40 that is soldered to the end of a conductor 42. This conductor passes through a rubber sleeve member 44 in the bulb socket, the sleeve member serving to properly position the contact 40 and bias it into close engagement with the bulb terminal. A fiber washer 46 is positioned between the contact and outer end of the rubber sleeve 44 to insulate the former against possible contact with the side wall of the bulb socket.

Below the bulb socket the lamp is provided with means forming battery compartments, which means include a horizontal shelf 48 having end flanges 50 that are secured to the housing side walls as by welding. The area below the shelf is divided into two equal compartments by means of a vertically disposed spacer plate 51, each compartment being adapted to receive a 6 volt battery (not shown). However, in the event that only one battery is used the spacer plate keeps it from sliding around and thereby insures that its terminals will be in proper position for engagement with the terminals of a common contact plate 52 that is detachably connected to the spacer.

The flasher or signal generator circuit for the lamp is preferably a transistor oscillator circuit of the type disclosed in U.S. Patent No. 2,829,257, issued April 1, 1958, to Elihu Root, 3rd, said patent and the present application being commonly owned. Accordingly, the electrical arrangement and operation of the circuit per se play no part of the present invention and reference is made to the patent for a complete disclosure thereof. This type of circuit is employed in the lamp of the present invention, however, because it can be assembled in very compact form, is simple and economical in construction, and is highly stable and efficient in operation.

The flasher circuit is illustrated schematically in the drawings where it is indicated generally at 54. The circuit is mounted on the battery compartment shelf 48, and one of its terminal leads 56 is connected to one of the battery terminals through a conductor 58, while its other terminal lead 60 is connected to the lamp bulb contact 40 through conductor 42. The other battery terminal is connected through a conductor 62 to a spring contact strip 64, one end of which is secured to an extension of the socket supporting strap 36 as by a rivet 66, see FIGURES 2, 3 and 5. As is best shown in FIGURE 5, the rivet, contact strip and conductor end are insulated from the strap 36 by fiber washers 68, the shank of the rivet passing with clearance through an oversized hole in the strap.

The contact strip 64 is formed so that its free end 70 is out of engagement with the strap 36, FIGURE 3, and an Allen screw 72 is threaded into the strap opposite this free end for movement into and out of engagement therewith. In this manner, the screw 72 serves as the on-and-off switch for the lamp and when in contact with the strip 64 completes a circuit from the batteries through conductor 62, strip 64, screw 72, strap 36 and bulb socket 32 to the lamp bulb; and from the base terminal of the bulb through contact 40, conductors 42 and 60, flasher circuit 54 and conductors 56 and 58 back to the batteries. Access to the Allen screw 72 for operating the switch is gained as through registering holes 74a, 74b in the rear wall of the housing and carrying handle respectively, FIGURES 3 and 5, this arrangement making the switch substantially tamper-proof since it can only be actuated by means of an Allen wrench.

Referring again to the removable front wall 12 of the lamp, this wall or closure is normally maintained in position by a latch member 76 which engages the top of the closure frame 14 and a pair of rivets 78 which project upwardly from the bottom of the lamp housing and pass with a free fit through holes 80 in the bottom of the closure frame. With this arrangement, the closure can be easily removed from the lamp by disengaging the latch 76 from the top of frame 14, pulling the upper portion of the closure outwardly until the reflector 18 is clear of the lamp bulb 30, and then lifting the closure to disengage the rivets 78 from the holes in the bottom of the closure frame, see FIGURE 3. The entire closure assembly, including reflector and lens, can thus be removed as a unit from the front of the housing for easy access to the electrical components therein.

In accordance with the invention, the operation of the latch 76 is controlled by the carrying handle 82 for the lamp, which handle is centrally mounted on the top of the lamp housing as shown. To this end, the front of the handle is pivotally connected as at 84 to a bracket 86 adjacent the front edge of the housing for swinging movement in the vertical plane towards or away from the housing. The latch is in turn pivotally connected to the handle at a pivot point 88 located rearwardly of the handle pivot point 84.

The latch 76 is arranged to engage a lip 90 at the upper edge of the closure frame, FIGURES 2 and 3, and this is accomplished by swinging the handle upwardly so that the latch is moved forwardly and can drop over the lip. Thereafter, swinging the handle in the opposite direction causes the latch to move rearwardly into tight locking engagement with the lip 90 due to the over-center or toggle relation of the latch pivot 88 to the handle pivot 84.

To prevent disengagement of the latch 76 from the lip 90 and thus removal of the front closure, and also to maintain the handle in fixed carrying position, means are provided to secure the free rear end 92 of the handle to the housing so that it is locked against swinging movement. This means comprises an Allen screw 94 which passes with a free fit through a hole in a cup 96 secured to the underside of the handle and is threadedly engageable with aligned tapped holes 98 formed in the rear of the housing and in the socket supporting strap 36, as is best shown in the FIGURES 3 and 5. Access to the screw 94 is gained through a hole 100 in the end of the handle, which hole is smaller than the head of the screw so that the latter cannot fall out but large enough to allow an Allen wrench to pass therethrough.

A mounting stirrup 102 is pivotally connected as at 104 to opposite points on the lamp housing side walls, and a nut 106 is welded to the bottom of this stirrup over a hole 108 for mounting the lamp on a traffic barricade or the like. This mounting arrangement permits the lamp to be pivotally adjusted at both the base of the stirrup and the pivotal axis 104 so that its light can be directed in the most effective manner. In this connection, the top of the carrying handle 82 is provided with three triangularly arranged aiming or sighting bumps 110, FIGURE 1, to aid in aiming the lamp in the proper direction. Since it may also be necessary in some instances to hang the lamp from a hook rather than to mount it by means of the stirrup 102, the back of the handle is provided with an inverted key-shaped hole 112 for this purpose.

From the foregoing description, it will be apparent that the invention disclosed herein provides a novel and highly practical construction and arrangement for hazard warning lamps of the character described. As will be apparent to those familiar with the art, the invention may be embodied in other specific forms without departing from the spirit or essential characteristics thereof. The embodiment disclosed is therefore to be considered in all respects as illustrative rather than restrictive, the scope of the invention being indicated by the appended claims.

What is claimed is:

1. A portable warning lamp of the character described comprising in combination an upstanding housing having an open front side, a removable closure for said open front side including a frame having a lens and reflector mounted therein, hinge means for securing said frame to the bottom of said housing, a carrying handle located at the top of said lamp, said handle being pivotally connected at one end to a point adjacent the front of said housing and movable from an open position to a normally closed position, releasable means normally securing the opposite end of said handle to a point adjacent the rear of the housing, and a latch member pivotally mounted on said handle adjacent the pivotally connected end thereof, said latch member being engageable with said closure frame to secure said frame to the top of said housing when said handle is normally secured in closed position and being releasable from the closure when said handle is in open position.

2. A warning lamp as defined in claim 1 together with means on said housing for adjustably mounting the lamp on a support, said mounting means having a pivotal connection to said housing on a horizontal axis and means for pivotally securing said mounting means on said support, said pivotal securing means having a vertical axis, for adjustment of the lamp in both the horizontal and vertical directions for proper aiming.

3. A portable flasher warning lamp of the character described comprising in combination an upstanding unitary housing, means connected to the rear wall of said housing for supporting a lamp bulb in the interior thereof;

means forming battery receiving compartments in the interior lower portion of said housing, a signal generator circuit supported by said compartment forming means, the front wall of said housing including a frame having a lens and a reflector for the lamp bulb mounted therein, said front wall being removable as a unit to open the entire front side of the lamp for easy access to said bulb supporting means, battery compartments and circuit, an upstanding carrying handle located at the top of said lamp, said handle being pivotally connected at one end to a point adjacent the front of said housing, the opposite end thereof being movable for swinging movement of said handle in a vertical plane towards or away from the housing, means on the opposite end of said handle engageable with coacting means on said housing when said opposite end is in contact therewith to releasably lock the handle against swinging movement, and a latch member pivotally mounted on said handle adjacent the pivotally connected end thereof, said latch member being engageable with the upper edge of said front wall frame and operable when said handle opposite end is swung into contact with said housing to lock said closure against removal, said latch member being disengageable from said front wall frame for removing said frame upon opposite swinging movement of said handle.

4. Lamp structure of the character described comprising in combination a unitary housing having top, bottom, side and rear walls, a removable closure for the front of said housing having a lens, lens frame and reflector secured together in a unitary assembly, means for removably securing said closure assembly to the bottom of said housing, a carrying handle hingedly connected at one end to the top of said housing for swinging movement from an open position to a closed position, means for securing the free end of said handle to said housing in closed position, and a toggle link latch member hingedly secured to said handle and movable with said handle to and from an open position disengaged from said closure assembly and a closed position engaged with said closure assembly for securing it to said housing, whereby the interior of said housing is accessible with said handle in open position and said handle in closed position provides means for carrying said lamp.

5. Lamp structure as defined in claim 4 wherein said means for securing the free end of said handle to said housing is a lock comprising a hexagonal socket cap screw, said handle having a recessed covered pocket for rotatably carrying said screw, the cover for said pocket having a hole in register with the socket in said cap screw and smaller than the head thereof, and said housing having a threaded hole for engagement by said cap screw whereby said handle may be locked to said housing by a hexagonal wrench inserted through the hole in said pocket cover.

6. The lamp structure defined in claim 5 having switch contact members mounted on said housing adjacent said cap screw lock and a second hexagonal socket cap screw threadedly engaged with one of said switch contact members, said housing and said handle having holes registering with the socket of said second cap screw, whereby said second cap screw may be engaged by said hexagonal wrench and rotated into contact with the other of said switch contact members.

7. Lamp structure as defined in claim 4 wherein the means for removably securing the closure assembly to the bottom of the housing comprises more than one upstanding stud member secured to the bottom of the housing, the bottom of the lens frame being provided with registering holes, whereby said closure assembly is removable from said housing.

8. A flasher warning lamp of the character described comprising in combination an upstanding keyhole shaped unitary housing having top, bottom, side, and rear walls; a similarly shaped closure for the front of said housing having a lens, a lens frame and an inwardly dished reflector secured together in a unitary assembly; means for removably securing said closure assembly to the front of said housing; a lamp bulb supported on the rear wall of said housing; said reflector occupying the major portion of the interior of said housing and having a central hole through which said bulb projects; the remaining portion of the interior of said housing having means forming battery receiving compartments therein; and a signal generator circuit mounted on said compartment forming means; the portion of said lens in front of said reflector being translucent and the portion in front of said battery receiving compartments being provided with light reflecting means.

9. A flashing warning lamp of the character described comprising in combination an upstanding unitary housing having top, bottom, side, and rear walls; a closure for the front of said housing having a lens, a lens frame and an inwardly dished parabolic reflector secured together in a unitary assembly; hinge means for securing said closure assembly to the bottom of said housing; a carrying handle hingedly connected at one end to the top of said housing for swinging movement from an open position to a closed position; means for removably securing the other end of said handle to the back of said housing in closed position; a toggle link latch member hingedly carried on said handle for engaging said closure assembly when said handle is in closed position; a lamp bulb supported on the rear wall of said housing; said reflector occupying the major portion of the interior of said housing and having a central hole through which said bulb projects; and a battery, a signal generator unit, and electrical connection wires in the remaining portion of said interior; the portion of the lens in front of said reflector being translucent and the remaining portion of said lens having light reflecting projections thereon.

10. A flasher warning lamp as defined in claim 9 together with a base member having a pivotal connection with said housing on a horizontal extending axis, said base member having a vertically extending threaded hole therein whereby said base may be secured to a support by a vertically extending bolt and said lamp may be mounted for pivotal movement on both horizontal and vertical axes.

11. A flasher warning lamp as defined in claim 10 wherein a portion of said handle in closed position is in a plane substantially parallel to the main axis of said reflector and is provided with sighting indicia aligned with said main axis whereby said lamp may be accurately aimed.

12. A portable warning lamp of the character described comprising in combination: a unitary housing having top, bottom, side, and rear walls; a similarly shaped closure for the front of said housing having a lens, a lens frame and an inwardly dished reflector secured together in a unitary assembly; said lens frame being adapted to be embraced by said housing, top, bottom and side walls; hinge means securing said lens frame to one wall of said housing; a carrying handle hingedly connected at one end to the wall of said housing opposite said hinge means, the other end of said handle being removably secured to the housing adjacent the rear thereof; and a latch member hingedly mounted on said handle adjacent the hinged connection thereof to said housing, said latch member being releasably engaged with said frame whereby said latch member may be released from engagement with said frame upon release of the said other end of the handle.

13. A portable flasher warning lamp of the character described comprising in combination: an upstanding keyhole shaped unitary housing having top, bottom, side and rear walls; a similarly shaped closure for the front of said housing having a lens, a lens frame, and an inwardly dished parabolic reflector secured together in a unitary assembly; said lens frame being adapted to be embraced by said housing top, bottom, and side walls; hinge means securing said lens frame to one wall of said housing; a carrying handle hingedly connected to the opposite wall of said housing, the free end of said handle being removably secured to the housing adjacent the rear thereof; a latch member hingedly mounted on said handle adjacent the hinged connection thereof to said housing, said latch member being releasably engaged with said frame; a lamp bulb supported on the rear wall of said housing; said reflector occupying the major portion of the interior of said housing and having a central hole through which said bulb projects, the remaining portion of the interior of said housing having means forming battery receiving compartments therein; and a signal generator circuit mounted on said compartment forming means, whereby said latch member may be released from engagement with said frame upon disengagement of the free end of said handle from said housing, said closure assembly removed and access had to the interior of said lamp.

References Cited in the file of this patent

UNITED STATES PATENTS

| | | |
|---|---|---|
| 757,848 | Steidl | Apr. 19, 1904 |
| 779,355 | Fessler | Jan. 3, 1905 |
| 1,455,938 | Rode et al. | May 22, 1923 |
| 2,045,274 | Kundig | June 23, 1936 |
| 2,481,444 | Pierrez | Sept. 6, 1949 |
| 2,540,341 | McNail | Feb. 6, 1951 |
| 2,589,747 | Tedeschi | Mar. 18, 1952 |
| 2,798,147 | Orsatti | July 2, 1957 |